(No Model.)
T. J. JOHNSON & J. L. MITCHELL.
COTTON PLANTER.
No. 415,042. Patented Nov. 12, 1889.
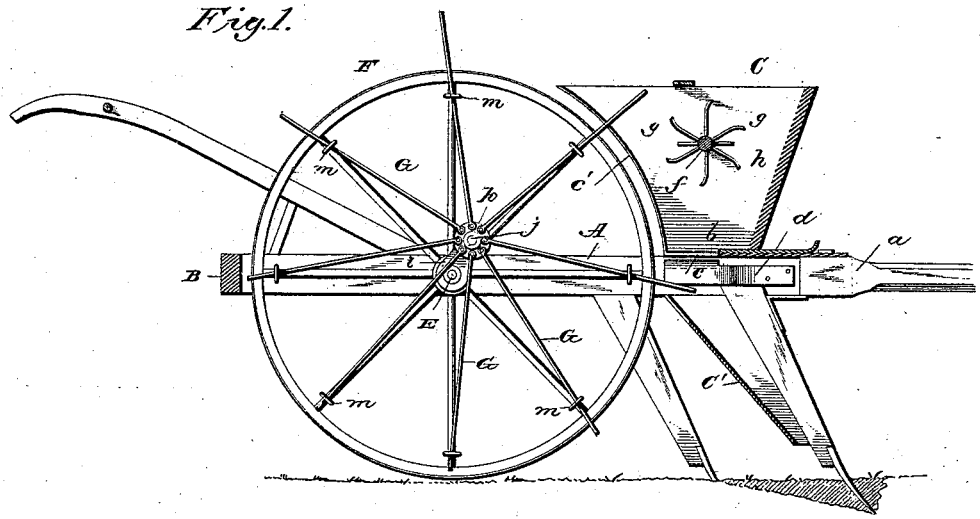
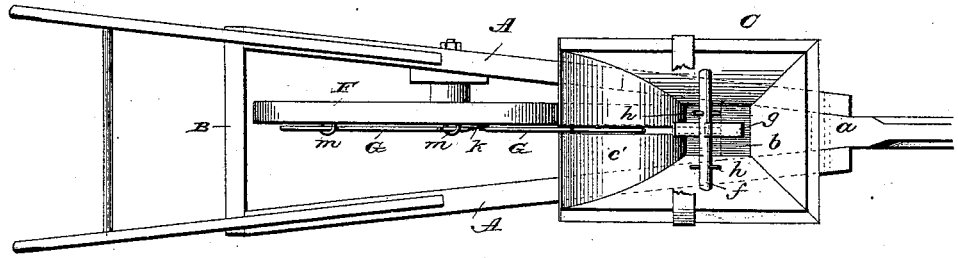
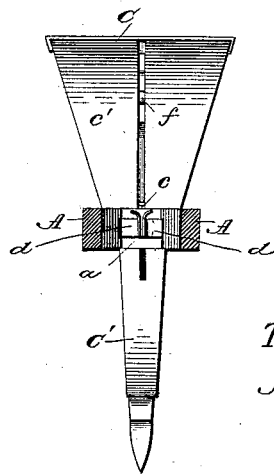
Thomas J. Johnson.
—and—
Joseph L. Mitchell.
Inventor
Witnesses
By his Attorneys

UNITED STATES PATENT OFFICE.

THOMAS J. JOHNSON AND JOSEPH L. MITCHELL, OF YOUNGSPORT, TEXAS.

COTTON-PLANTER.

SPECIFICATION forming part of Letters Patent No. 415,042, dated November 12, 1889.

Application filed August 22, 1889. Serial No. 321,614. (No model.)

*To all whom it may concern:*

Be it known that we, THOMAS J. JOHNSON and JOSEPH L. MITCHELL, citizens of the United States of America, residing at Youngsport, in the county of Bell and State of Texas, have invented certain new and useful Improvements in Corn and Cotton Planters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention has reference to corn and cotton planters; and it consists in the improved machine detailed hereinafter, wherein a series of rods actuated by the main carrying-wheel are intermittently projected beyond the periphery of the latter at or about the time they approach the seed-hopper, so that they may enter said hopper and cause the seed to be fed to the drill-tube.

In the accompanying drawings, Figure 1 is a vertical longitudinal section of our improved planter. Fig. 2 is a plan view of the same. Fig. 3 is a rear detail view of the hopper and discharge-valve and the feed-tube.

The frame of the machine consists of two side bars A A, which converge at their front end, at which point they may be connected by a tongue or clevis-block $a$, and at their rear said bars A A are joined by a transverse bar B. The hopper C is mounted on the forward part of the frame, and the bottom $b$ of said hopper has a short longitudinal slot $c$ immediately over the upper end of a forwardly-inclined feed-delivery tube C′, the front of which is extended for the attachment of a cultivator-shovel intended to produce the grain-furrow.

The communication between the hopper and the grain-tube is closed by two spring-plates $d\ d$, secured at their upper edges to the hopper-bottom adjacent to the slot therein, and the normal tendency of which is to cause them to bear against each other and close said communication. The rear wall $c'$ of the hopper is provided with a central vertical slot which intersects the slot in the bottom of the same, and in practice this slot may be normally closed by any suitable system of adjustable spring-plates as may be found desirable. A transverse shaft $f$ bears in the side walls of said hopper and carries centrally a series of radial blades or stirrers $g$, upon either side of which are arranged stirring-pins $h$.

A short stub-shaft E bears in one of the side bars A of the frame, and has its inner end projecting within the frame for the bearing of the main carrying-wheel F. This latter wheel turns upon said shaft, which in itself is fixed, and the inner projecting end of said shaft has connected thereto a crank-arm $i$, provided at its outer end with a wrist-pin $j$, upon which loosely turns the hub $k$. A series of radial arms G are pivotally attached at their inner ends to the said hub, and extend through a circular series of loops $m$, located on the side of the carrying-wheel adjacent to the periphery thereof.

From the description previously detailed it will be readily understood that as the carrying-wheel rotates under the motion of the machine the connection of the rods to the hub is eccentrically located relative to the axis of the carrying-wheel, so that each rod is intermittently projected beyond the carrying-wheel once during a complete revolution of the wheel. The position of the crank-arm and hub-connection is such that the projecting effect alluded to is accomplished as the arms approach the rear wall of the feed-hopper, and inasmuch as they are in a line with the slot in the same their projecting portions will pass through said slot, contact with one of the blades on the shaft $f$, and in their further descent pass between the spring-valve plates in the bottom of the hopper and separate the same, so that the seed may be readily fed from the hopper into the feed-tube. Of course the opening of the valve-plates is but momentary; but it is, however, sufficient to enable the measured charge to pass from the hopper. As the rods clear the valve-plates in the upper end of the feed-tube, the eccentric connection causes their retraction within the periphery of the wheel, so that they do not operate to retard the free rotation of the latter during movement of the machine.

In practical use it will be found convenient to employ suitable fender devices to guard the lower portion of the wheel with its carrying-rods and prevent any clogging tending to prevent the free reciprocation of the rods.

From the foregoing it will be seen that the device hereinbefore set forth is of simple construction, comprises comparatively few parts, and is entirely automatic in its operation.

We claim—

1. The combination, with the main frame and a hopper located thereon, provided with a valved bottom, of a main carrying-wheel and a series of radial arms playing in guides on the sides of said carrying-wheel, and having a fixed connection at their inner ends located eccentrically with respect to the axis of the carrying-wheel and adapted to be projected beyond the carrying-wheel to operate the valve in the seed-hopper, substantially as set forth.

2. The combination, with the main frame, of a seed-hopper located thereon and having a valve in its bottom composed of two spring yielding contacting plates, a carrying-wheel, and a series of radial rods playing in guides on the side of said carrying-wheel, and having fixed connection at their inner ends located eccentrically with respect to the axis of the carrying-wheel, substantially as set forth.

3. The combination, with the main frame, a seed-hopper located thereon and provided with a transverse shaft having stirrer-blades, spring yielding valve-plates in the bottom of said hopper, and a stub-shaft and carrying-wheel turning thereon, of fixed crank-arms connected to the inner end of said stub-shaft, and provided with a wrist-pin, upon which a hub is loosely mounted, and a series of radial rods playing in guides on the sides of said carrying-wheel, and connected at their inner ends to said hub, and adapted to be intermittently projected beyond the periphery of the carrying-wheel to contact with the stirrer-blades and valve-plates of the hopper, substantially as set forth.

In testimony whereof we affix our signatures in presence of two witnesses.

THOMAS J. JOHNSON.
JOSEPH L. MITCHELL.

Witnesses:
JOHN RAY,
I. C. FLETCHER.